(12) United States Patent
Agarwal et al.

(10) Patent No.: US 8,279,569 B2
(45) Date of Patent: Oct. 2, 2012

(54) APPARATUS FOR PREVENTING OVER/UNDER VOLTAGE, LIGHT EMITTING MODULE, AND DISPLAY APPARATUS

(75) Inventors: Pankaj Agarwal, Suwon-si (KR);
Sung-jin Choi, Gunpo-si (KR);
Tae-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 12/724,548

(22) Filed: Mar. 16, 2010

(65) Prior Publication Data
US 2010/0309597 A1 Dec. 9, 2010

(30) Foreign Application Priority Data
Jun. 9, 2009 (KR) .................. 10-2009-0051026

(51) Int. Cl.
*H02H 3/00* (2006.01)
(52) U.S. Cl. ................................................ 361/90
(58) Field of Classification Search ..................... 361/90
See application file for complete search history.

(56) References Cited

U.S. PATENT DOCUMENTS

| | | | |
|---|---|---|---|
| 6,489,728 B2 * | 12/2002 | Guthrie et al. | 315/200 A |
| 6,650,064 B2 * | 11/2003 | Guthrie et al. | 315/185 R |
| 7,006,114 B2 * | 2/2006 | Sakaguchi | 345/690 |

* cited by examiner

*Primary Examiner* — Stephen W Jackson
(74) *Attorney, Agent, or Firm* — Sughrue Mion, PLLC

(57) ABSTRACT

An apparatus for preventing abnormal voltage, a light emitting module, and a display apparatus are provided. The present apparatus for preventing abnormal voltage extracts the highest voltage and the lowest voltage among voltage applied from a plurality of loads, includes two voltage distribution units distributing the highest voltage and the lowest voltage, and detects whether the highest voltage and the lowest voltage applied from the voltage distribution unit are within a predetermined range. Accordingly, the apparatus for preventing abnormal voltage is not affected greatly in terms of its size and cost even if the number of loads to be protected increases.

18 Claims, 3 Drawing Sheets

APPARATUS FOR PREVENTING OVER/UNDER VOLTAGE, LIGHT EMITTING MODULE, AND DISPLAY APPARATUS

CROSS-REFERENCE TO RELATED APPLICATIONS

This application claims priority from Korean Patent Application No. 10-2009-51026, filed on Jun. 9, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to an apparatus for preventing over or under voltage, a light emitting module and a display device, and more particularly, to an apparatus for preventing over or under voltage by shutting down voltage when there is over or under voltage, a light emitting module and a display apparatus.

2. Description of the Related Art

Each electronic apparatus has an appropriate range of voltage. If over voltage or under voltage, beyond rated voltage, is applied to an electronic apparatus, the electronic apparatus may not operate normally, or even be out of order. In order not to apply abnormal voltage (over voltage or under voltage) to an electronic apparatus, manufacturers install an apparatus for preventing abnormal voltage in an electronic apparatus.

The apparatus for preventing abnormal voltage detects whether over voltage or under voltage is applied to an electronic apparatus and protects the electronic apparatus from over or under voltage. The conventional apparatus for preventing abnormal voltage has two voltage distributors for each of a plurality of loads. That is, the conventional apparatus for preventing abnormal voltage has a structure in which every n load requires 2n of voltage distributors.

Accordingly, if the number of loads to be protected increases, the size and cost of the apparatus for preventing abnormal voltage also increase. Therefore, an apparatus for protecting an electronic apparatus from abnormal voltage of which size or cost are not affected even if the number of loads to be protected increases is required.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide an apparatus for preventing abnormal voltage which detects the highest and the lowest voltage applied from a plurality of loads, includes two voltage distributors distributing the highest and the lowest voltage respectively, and detects whether the highest and the lowest voltage applied from the voltage distributors are within a predetermined range.

An apparatus for preventing abnormal voltage, according to an exemplary embodiment of the present invention, comprises an extraction unit which is connected to each of a plurality of loads and extracts the highest voltage and the lowest voltage among voltage applied from the plurality of loads, a first voltage distribution unit to distribute the highest voltage output from the extraction unit, a second voltage distribution unit to distribute the lowest voltage output from the extraction unit, and a detection unit to detect whether the highest voltage and the lowest voltage applied from the first voltage distribution unit and the second voltage distribution unit are within a predetermined range.

The detection unit may output a predetermined signal if the highest voltage is lower than the lowest reference voltage or the highest voltage is higher than the highest reference voltage.

The detection unit may comprise a first operational amplifier to which the lowest voltage and the lowest reference voltage distributed and applied from the first voltage distribution unit are applied, in which a first diode is connected to an output terminal, and which outputs the predetermined signal if the lowest voltage is lower than the lowest reference voltage and a second operational amplifier to which the highest voltage and the highest reference voltage distributed and applied from the second voltage distribution unit are applied, in which a second diode is connected to an output terminal, and which outputs the predetermined signal if the highest voltage is higher than the highest reference voltage.

The predetermined signal may be a signal to shut down the plurality of loads.

The detection unit may output a predetermined signal if difference between the highest voltage and the lowest voltage is greater than reference voltage difference.

The detection unit may comprise a third operational amplifier to which the lowest voltage distributed and applied from the first voltage distribution unit and the highest voltage distributed and applied from the second voltage distribution unit are applied and which outputs voltage difference between the lowest voltage and the highest voltage and a fourth operational amplifier to which the voltage difference and the reference voltage difference are applied, and in which a third diode is connected to an output terminal, and which outputs the predetermined signal if the voltage difference is greater than the reference voltage difference.

The first voltage distribution unit may distribute the lowest voltage using a plurality of resistances, and the second voltage distribution unit may distribute the highest voltage using a plurality of resistances.

The first voltage distribution unit may include a first resistance and a second resistance which have serial connection, the lowest voltage output from the extraction unit is applied to one end of the first resistance, one end of the second resistance is grounded, and the detection unit is connected to a portion between the first resistance and the second resistance.

The second voltage distribution unit may include a third resistance and a fourth resistance which have serial connection, the highest voltage output from the extraction unit is applied to one end of the third resistance, one end of the fourth resistance is grounded, and the detection unit is connected to a portion between the third resistance and the fourth resistance.

The plurality of loads include N (N is a natural number which is more than 2) loads, and the extraction unit may include N diode pairs in which two diodes form serial connection and bias impedance, each of the N diode pairs may be connected in parallel and the bias impedance may be connected to the N diode pairs in parallel, and each of the N loads may be connected to a portion between two diodes included in each of the N diode pairs.

The bias impedance may be bias resistance.

The plurality of loads may be a plurality of light emitting diodes (LEDs).

The output highest voltage may be voltage of a node corresponding to an anode of the N diode pairs among nodes to which the N diode pairs are connected in parallel.

The output lowest voltage may be voltage of a node corresponding to a cathode of the N diode pairs among nodes to which the N diode pairs are connected in parallel.

A light emitting module, according to an exemplary embodiment of the present invention, includes the apparatus for preventing abnormal voltage disclosed in the above.

A display apparatus according to an exemplary embodiment of the present invention, includes the apparatus for preventing abnormal voltage disclosed in the above.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
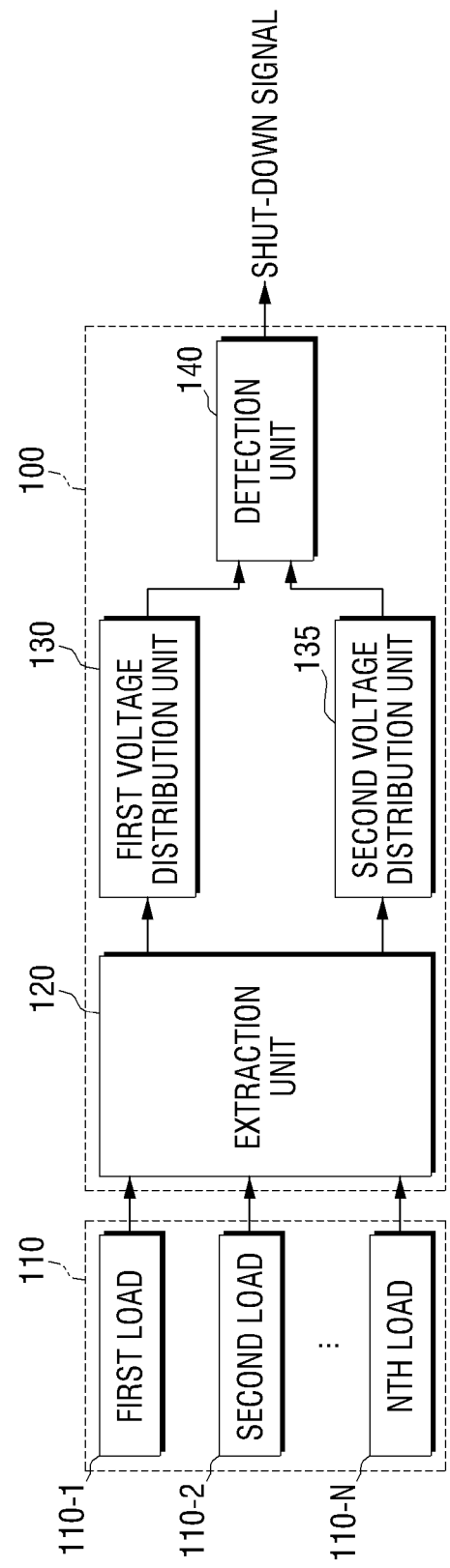
FIG. 1 is a block diagram illustrating a functional structure of an apparatus for preventing abnormal voltage, according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a functional structure of an apparatus for preventing abnormal voltage 100, according to an exemplary embodiment of the present invention. As illustrated in FIG. 1, the apparatus for preventing abnormal voltage 100 comprises an extraction unit 120, a first voltage distribution unit 130, a second voltage distribution unit 135 and a detection unit 140. The apparatus for preventing abnormal voltage 100 is connected to N loads 110. The 'N' represents a natural number which is more than 2.

The N loads 110 includes a first load 110-1 to an N load 110-N. Each of the N load 110 is connected to the apparatus for preventing abnormal voltage 100. That is, the N loads 110 are under protection of the apparatus for preventing abnormal voltage 100. The N loads 110 may be various loads. For instance, the apparatus for preventing abnormal voltage 100 protects a light emitting diode (LED) backlight apparatus, the N loads 100 may be N LEDs.

The extraction unit 120 is connected to each of N loads 110, and extracts the highest and the lowest voltage from among voltage applied from the N loads 110. The extraction unit 120 applies the lowest voltage to the first voltage distribution unit 130 and the highest voltage to the second voltage distribution unit 135.

The first voltage distribution unit 130 distributes the lowest voltage output from the extraction unit 120 to the detection unit 140 in an appropriate size. The second voltage distribution unit 135 distributes the highest voltage output from the extraction unit 120 in an appropriate size.

In general, the rated voltage of load is different from the rated voltage of the detection unit 140. Since the detection unit 140 includes a operational amplifier, the rated voltage of the detection unit 140 may be approximately 5~15V. On the other hand, the rated voltage of load differs depending on the type of load, and may be more than 100V. Accordingly, the first voltage distribution unit 130 and the second voltage distribution unit 135 distribute the lowest voltage and the highest voltage of N loads 110 in a predetermined ratio so that the lowest voltage and the highest voltage of N loads 110 may be within the range of rated voltage of the detection unit 140.

For instance, the first voltage distribution unit 130 and the second voltage distribution unit 135 may distribute voltage to one tenth of its original voltage and distributes it. In this case, if the extraction unit 120 extracts the lowest voltage of 50V and the highest voltage of 100V, the first voltage unit 130 outputs 5V to the detection unit 140 and the second voltage distribution unit 135 outputs 10V to the detection unit 140.

The detection unit 140 detects whether the lowest voltage and the highest voltage applied from the first voltage distribution unit 130 and the second voltage distribution unit 135 are within a predetermined range, and if the lowest voltage and the highest voltage are beyond the predetermined range, the detection unit 140 outputs a predetermined signal.

The predetermined range represents the range of rated voltage of the N loads 110. If the loads included in the N loads 110 have different rated voltage, the predetermined range is determined between the highest value among low values of rated voltage and the lowest value among high values of rated voltage to satisfy the range of rated voltage of every load. If there are 3 loads, and the range of rated voltage of load A is 100V~200V, the range of rated voltage of load B is 90V~190V, and the range of rated voltage of load C is 80V~230V, the predetermined range becomes 100V~190V.

In addition, the predetermined range defines the lowest reference voltage, the highest reference voltage, and reference voltage difference. The lowest reference voltage becomes the lowest value of the predetermined range, the highest reference voltage becomes the highest value of the predetermined range, and the reference voltage reference becomes difference between the highest value and the lowest value of the predetermined range. For instance, if the predetermined range is 100V~190V, the lowest reference voltage is 100V, the highest reference voltage is 190V, and the reference voltage difference is 90V.

The predetermined signal is a signal, e.g., a feedback signal, to shut down the N loads. If voltage is beyond the predetermined range, that is, the voltage is abnormal voltage the detection unit 140 outputs a shutdown signal to protect the N loads 110.

Figure 2:
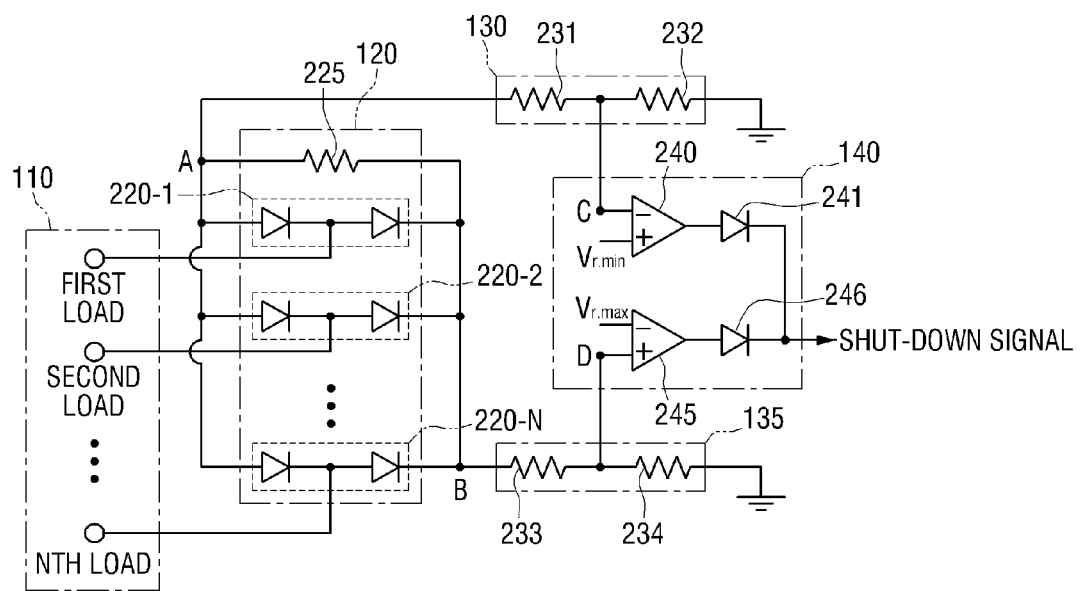
FIG. 2 is a circuit diagram of an apparatus for preventing abnormal voltage, according to an exemplary embodiment of the present invention.

Specifically, if the lowest voltage is lower than the lowest reference voltage, or if the highest voltage is higher than the highest reference voltage, the detection unit 140 outputs a predetermined signal. That is, the detection unit 140 detects whether abnormal voltage is applied using the lowest value and the highest value of the predetermined range. The circuit structure of the detection unit 140 for this is illustrated in FIG. 2.

Figure 3:
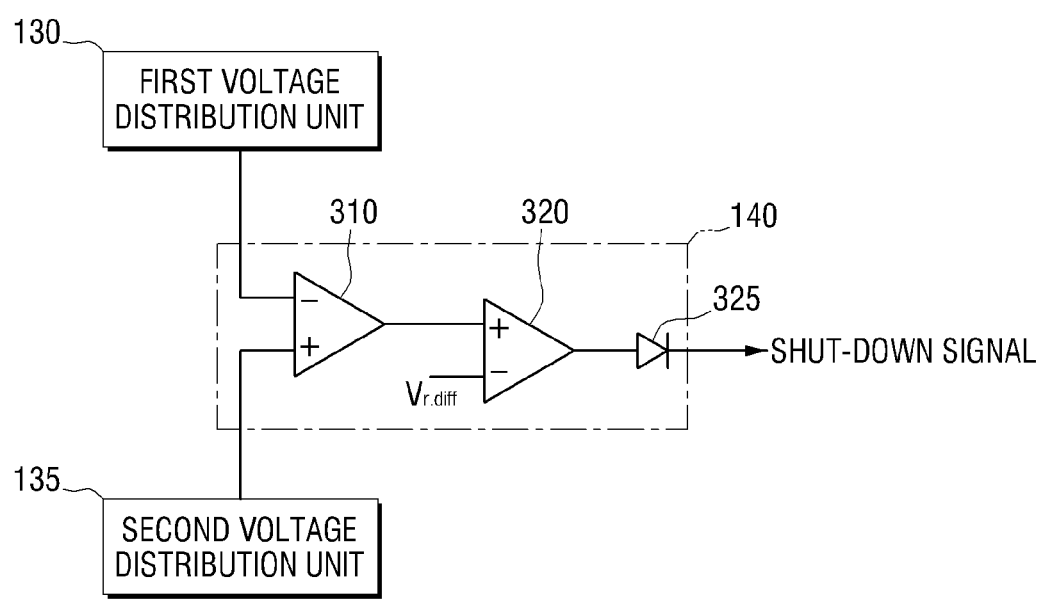
FIG. 3 is a view illustrating a circuit of a detection unit when difference between the highest voltage and the lowest voltage is used, according to another exemplary embodiment of the present invention.

In addition, if the difference between the highest voltage and the lowest voltage is greater than reference voltage difference, the detection unit 140 may output a predetermined signal. In this case, the detection unit 140 detects whether abnormal voltage is applied using difference between the highest value and the lowest value of the predetermined range. The circuit structure of the detection unit 140 for this is illustrated in FIG. 3.

As described above, the apparatus for preventing abnormal voltage 100 includes only two voltage distributors, and even if the number of load increases, there ins no change in the number of the voltage distributors. Accordingly, although the apparatus for preventing abnormal voltage 100 protects a plurality of loads, the size is small and the cost is low.

Hereinafter, a detailed circuit diagram of the apparatus for preventing abnormal voltage 100 will be explained with reference to FIG. 2 and FIG. 3. FIG. 2 is a circuit diagram of an apparatus for preventing abnormal voltage, according to an exemplary embodiment of the present invention.

As illustrated in FIG. 2, the extraction unit 120 includes N diode pairs 220-1~220-N and bias resistance 225.

The N diode pairs 220-1~220-N are connected in parallel. The diode pair includes two diodes which form serial connection towards the same direction, and each load is connected between the two diodes included in each of the diode pair.

The bias resistance 225 is connected to the N diode pairs 220-1~220-N in parallel. The bias resistance 225 causes voltage drop so that the lowest voltage and the highest voltage can be applied to the ends of the diode pair respectively.

The extraction unit 120 may employ various kinds of bias impedance other than the bias resistance 225 to cause voltage drop. For instance, a bias capacitor may be used as bias impedance.

The extraction unit 120 having the above structure has the highest voltage among the voltage of the N loads 110 in the right end (B) and has the lowest voltage in the left end (A). Accordingly, the extraction unit outputs the highest voltage among the voltage of the N loads 110 via A, and outputs the lowest voltage via B.

In other words, the highest voltage extracted from the extraction unit 120 is the voltage of the node corresponding to the anode of the N diode pairs 220-1~220-N among the nodes to which the N diode pairs 220-1~220-N are connected in parallel. The lowest voltage extracted from the extraction unit 120 is the voltage of the node corresponding to the cathode of the N diode pairs 220-1~220-N among the nodes to which the N diode pairs 220-1~220-N are connected in parallel.

The first voltage distribution unit 130 distributes voltage using a first resistance 231 and a second resistance 232. The first resistance 231 and the second resistance 232 are connected with each other in serial connection. One end of the first resistance 231 is connected to A of the extraction unit 120 and receives the lowest voltage output from the extraction unit 120. One end of the second resistance 232 is grounded.

The extraction unit 140 is connected to the portion between the first resistance 231 and the second resistance 232. The voltage of the portion between the first resistance 231 and the second resistance 232 is determined according to a ratio of the resistance value of the first resistance 231 and the resistance value of the second resistance 232. Accordingly, the resistance value of the first resistance 231 and the resistance value of the second resistance 232 should be selected considering the range of appropriate voltage of the extraction unit 140.

By doing so, the first voltage distribution unit 130 distributes the lowest voltage of the N loads 110.

The second voltage distribution unit 135 distributes voltage using a third resistance 233 and the fourth resistance 234. The third resistance 233 and the fourth resistance 234 are connected with each other in serial connection. One end of the third resistance 233 is connected to B of the extraction unit 120 and receives the highest voltage output from the extraction unit 120. One end of the fourth resistance 234 is grounded.

The extraction unit 140 is connected to the portion between the third resistance 233 and the fourth resistance 234. The voltage of the portion between the third resistance 233 and the fourth resistance 234 is determined according to a ratio of the resistance value of the third resistance 233 and the resistance value of the fourth resistance 234. Accordingly, the resistance value of the third resistance 233 and the resistance value of the fourth resistance 234 should be selected considering the range of appropriate voltage of the extraction unit 140.

By doing so, the second voltage distribution unit 135 distributes the highest voltage of the N loads 110.

As illustrated in FIG. 2, the detection unit 140 includes a first operational amplifier 240, a first diode 241, a second operational amplifier 245, and a second diode 246.

In the first operational amplifier 240, the lowest voltage distributed and applied from the first voltage distribution unit 130 is applied to a cathode, and the lowest reference voltage (Vr.min) is applied to an anode. The first diode 241 is connected to the output terminal of the first operational amplifier 240.

In the above structure, if the voltage applied to the cathode of the first operational amplifier 240 is higher than the lowest reference voltage (Vr.min), the output voltage becomes a low level and cannot penetrate the first diode 241.

On the other hand, if the voltage applied to the cathode of the first operational amplifier 240 is lower than the lowest reference voltage (Vr.min), the output voltage becomes a high level and can penetrate the first diode 241. This is the case in which under voltage (that is, abnormal voltage) is applied to the N loads 110. Accordingly, the signal penetrating the first diode 241 of the output terminal of the first operational amplifier 240 becomes a predetermined signal (that is, a shut-down signal).

In the second operational amplifier 245, the highest voltage distributed and applied from the second voltage distribution unit 135 is applied to an anode, and the highest reference voltage (Vr.max) is applied to a cathode. The second diode 246 is connected to the output terminal of the second operational amplifier 245.

In the above structure, if the voltage applied to the anode of the second operational amplifier 245 is lower than the highest reference voltage (Vr.max), the output voltage becomes a low level and cannot penetrate the second diode 246.

On the other hand, if the voltage applied to the cathode of the second operational amplifier 245 is higher than the highest reference voltage (Vr.max), the output voltage becomes a high level and can penetrate the second diode 246. This is the case in which over voltage (that is, abnormal voltage) is applied to the N loads 110. Accordingly, the signal penetrating the second diode 246 of the output terminal of the second operational amplifier 245 becomes a predetermined signal (that is, a shut-down signal).

In the detection unit 140 having the above circuit structure, if the lowest voltage and the highest voltage of a load is not within the range between the reference minimum voltage and the reference maximum voltage, the detection unit 140 outputs a shut-down signal. Accordingly, the detection unit 140 may detect whether abnormal voltage is applied to a load.

Below is an example of applying an actual voltage value to the N loads 110. In the example, the first load 100-1 is 100V, the second load 110-2 is 140V, the third load to the N−1 load are 150V, and the N load 100-N is 200V. In this case, the lowest voltage of 100 V is applied to A, and the highest voltage of 200V is applied to B.

If the first voltage distribution unit 130 and the second voltage distribution unit 135 distributes one tenth of voltage, 10V is applied to C and 20V is applied to D.

Accordingly, if the lowest reference voltage (Vr.min) is higher than 10V, the first operational amplifier 240 outputs a shut-down signal as the voltage of the output terminal penetrates the first diode 241. If the highest reference voltage (Vr.max) is lower than 20V, the second operational amplifier 245 outputs a shut-down signal as the voltage of the output terminal penetrates the second diode 246.

Accordingly, the apparatus for preventing abnormal voltage may shut down a load if there is abnormal voltage in the load.

In the above description, the detection unit 140 uses the lowest reference voltage and the highest reference voltage in FIG. 2, but this is only an example. The detection unit 140 may use a reference voltage difference. The circuit structure of the detection unit 140 will be explained in detail with reference to FIG. 3.

FIG. 3 is a view illustrating a circuit of the detection unit 140 when difference between the highest voltage and the lowest voltage is used, according to another exemplary embodiment of the present invention. As illustrated in FIG. 3, the detection unit 140 includes a third operational amplifier 310, a fourth amplifier 320, and a third diode 325.

The cathode of the third operational amplifier 310 is connected to the first voltage distribution unit 130, and the lowest voltage distributed and applied from the first voltage distribution unit 130 is applied. The (+) operational amplifier 310 is connected to the second voltage distribution unit 135, and the highest voltage distributed and applied from the second voltage distribution unit 135 is applied. The output terminal of the third operational amplifier 310 outputs voltage difference between the highest voltage and the lowest voltage. The third operational amplifier 310 is described to have a simple operational amplifier structure for convenience of explanation, but the third operational amplifier 310 may have a operational amplifier structure including feedback resistances.

The anode of the fourth operational amplifier 320 is connected to the output terminal of the third operational amplifier 310 and the highest voltage and the lowest voltage are applied. The reference voltage difference (Vr.diff) is applied to the cathode of the fourth operational amplifier 320. The third diode 325 is connected to the output terminal of the fourth operational amplifier 320.

Accordingly, if voltage difference is lower than the reference voltage difference, the output terminal of the fourth operational amplifier 320 outputs (−) voltage, and thus the voltage cannot penetrate the third diode 325.

On the other hand, if voltage difference is higher than the reference voltage difference, the output terminal of the fourth operational amplifier 320 outputs (+) voltage, and thus the voltage can penetrate the third diode 325, which means abnormal voltage is applied to a load. Accordingly, the voltage signal that penetrates the third diode 325 becomes a shut-signal to shut down the load.

As such, the apparatus for preventing abnormal voltage 100 may detect abnormal voltage using voltage difference between the highest voltage and the lowest voltage.

The apparatus for preventing abnormal voltage 100, according to an exemplary embodiment of the present invention, may be applied to various electronic apparatuses. For instance, the apparatus for preventing abnormal voltage 100 may be applied to a light source, e.g., a light emitting module. In this case, the N loads 110 may be a light emitting element (for instance, an LED element). If a shut-down signal is output from the apparatus for preventing abnormal voltage 100, the light emitting module may protect the light emitting element from abnormal voltage by shutting down light emitting elements.

The apparatus for preventing abnormal voltage 100 may also be applied to a display apparatus. In this case, if a shut-down signal is output from the apparatus for preventing abnormal voltage 100, the display apparatus may protect the display apparatus from abnormal voltage by shutting down the display state.

According to various examples of the present invention, the exemplary embodiments of the present invention extract the highest voltage and the lowest voltage among voltage applied from a plurality of loads, include two voltage distributors distributing the highest voltage and the lowest voltage respectively, and provide an apparatus for preventing abnormal voltage which detects whether the highest voltage and the lowest voltage are within a predetermined range, so that even if there are a plurality of loads to be protected, the apparatus for preventing abnormal voltage is not greatly affected in terms of its size and cost. Accordingly, a plurality of loads can be protected from abnormal voltage using a small-sized and inexpensive apparatus for preventing abnormal voltage.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for preventing abnormal voltage, comprising:
   an extraction unit which is connected to a plurality of loads and extracts the highest voltage and the lowest voltage among voltages applied from the plurality of loads;
   a first voltage distribution unit which distributes the highest voltage output from the extraction unit;
   a second voltage distribution unit which distributes the lowest voltage output from the extraction unit; and
   a detection unit which detects whether the highest voltage and the lowest voltage applied from the first voltage distribution unit and the second voltage distribution unit are within a predetermined range.

2. The apparatus as claimed in claim 1, wherein the detection unit outputs a predetermined signal if the highest voltage is lower than a lowest reference voltage or the highest voltage is higher than a highest reference voltage.

3. The apparatus as claimed in claim 2, wherein the detection unit comprises:
   a first operational amplifier to which the lowest voltage and the lowest reference voltage distributed and applied from the first voltage distribution unit are applied, the first operational amplifier comprising an output terminal and a first diode connected to the first output terminal, and the first operational amplifier outputs the predetermined signal if the lowest voltage is lower than the lowest reference voltage; and
   a second operational amplifier to which the highest voltage and the highest reference voltage distributed and applied from the second voltage distribution unit are applied, the second operational amplifier comprising a second output terminal and a second diode connected to the second output terminal, and the second operational amplifier outputs the predetermined signal if the highest voltage is higher than the highest reference voltage.

4. The apparatus as claimed in claim 2, wherein the predetermined signal is a signal to shut down the plurality of loads.

5. The apparatus as claimed in claim 1, wherein the detection unit outputs a predetermined signal if a difference between the highest voltage and the lowest voltage is greater than a reference voltage difference.

6. The apparatus as claimed in claim 5, wherein the detection unit comprises:
one operational amplifier to which the lowest voltage distributed and applied from the first voltage distribution unit and the highest voltage distributed and applied from the second voltage distribution unit, are applied, the one operational amplifier outputting a voltage difference between the lowest voltage and the highest voltage; and
another operational amplifier to which the voltage difference and the reference voltage difference are applied, the other operational amplifier comprising a third diode connected to an output terminal, and the other operational amplifier outputs the predetermined signal if the voltage difference is greater than the reference voltage difference.

7. The apparatus as claimed in claim 1, wherein the first voltage distribution unit distributes the lowest voltage using a first plurality of resistances, and
wherein the second voltage distribution unit distributes the highest voltage using a second plurality of resistances.

8. The apparatus as claimed in claim 1, wherein the first voltage distribution unit comprises a first resistance and a second resistance which are serially connected,
wherein the lowest voltage output from the extraction unit is applied to one end of the first resistance, one end of the second resistance is grounded, and the detection unit is connected between the first resistance and the second resistance.

9. The apparatus as claimed in claim 1, wherein the second voltage distribution unit includes one resistance and another resistance which are serially connected,
wherein the highest voltage output from the extraction unit is applied to one end of the one resistance, one end of the other resistance is grounded, and the detection unit is connected between the one resistance and the other resistance.

10. The apparatus as claimed in claim 1, wherein the plurality of loads comprises N (N is a natural number which is greater than 2) loads,
wherein the extraction unit includes N diode pairs in which each of the N diode pairs form a serial connection and bias impedance,
wherein each of the N diode pairs are connected in parallel and the bias impedance is connected to the N diode pairs in parallel, and
wherein each of the N loads is connected to a portion between two diodes in each of the N diode pairs.

11. The apparatus as claimed in claim 10, wherein the bias impedance is bias resistance.

12. The apparatus as claimed in claim 1, wherein the plurality of loads comprises a plurality of light emitting diodes (LEDs).

13. The apparatus as claimed in claim 10, wherein the output highest voltage is voltage of a node corresponding to an anode of the N diode pairs among nodes to which the N diode pairs are connected in parallel.

14. The apparatus as claimed in claim 10, wherein the output lowest voltage is voltage of a node corresponding to a cathode of the N diode pairs among nodes to which the N diode pairs are connected in parallel.

15. A light emitting module comprising an apparatus for preventing abnormal voltage, the apparatus comprising:
an extraction unit which is connected to a plurality of loads and extracts the highest voltage and the lowest voltage among voltages applied from the plurality of loads;
a first voltage distribution unit which distributes the highest voltage output from the extraction unit;
a second voltage distribution unit which distributes the lowest voltage output from the extraction unit; and
a detection unit which detects whether the highest voltage and the lowest voltage applied from the first voltage distribution unit and the second voltage distribution unit are within a predetermined range.

16. A display apparatus comprising an apparatus for preventing abnormal voltage, the apparatus for preventing abnormal voltage comprising:
an extraction unit which is connected to a plurality of loads and extracts the highest voltage and the lowest voltage among voltages applied from the plurality of loads;
a first voltage distribution unit which distributes the highest voltage output from the extraction unit;
a second voltage distribution unit which distributes the lowest voltage output from the extraction unit; and
a detection unit which detects whether the highest voltage and the lowest voltage applied from the first voltage distribution unit and the second voltage distribution unit are within a predetermined range.

17. An apparatus to shut down a plurality of loads when an abnormal voltage is received, the apparatus comprising:
a plurality of loads which receive a plurality of voltages;
an extraction unit which extracts a highest voltage and a lowest voltage of the plurality of voltages received by the plurality of loads; and
a detector which detects whether any one of the highest and the lowest voltages is an abnormal signal by comparing the highest and the lowest voltages with a reference voltage or a reference range, and which outputs a feedback signal to the plurality of loads to shut down the plurality of loads if there is the abnormal signal.

18. The apparatus of claim 17, wherein the plurality of loads comprises a plurality of light sources.

* * * * *